P. W. SIEURIN.
FRICTION COUPLING.
APPLICATION FILED MAY 22, 1915.

1,200,769.

Patented Oct. 10, 1916.

UNITED STATES PATENT OFFICE.

PAUL WILHELM SIEURIN, OF GOTTENBORG, SWEDEN.

FRICTION-COUPLING.

1,200,769.   Specification of Letters Patent.   Patented Oct. 10, 1916.

Application filed May 22, 1915. Serial No. 29,841.

*To all whom it may concern:*

Be it known that I, PAUL WILHELM SIEURIN, director, a subject of the King of Sweden, and resident of Lilla Torget 6, Gottenborg, Sweden, have invented certain new and useful Improvements in Friction-Couplings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention is based on couplings provided with friction rings, and is characterized by the fact that the driving shaft itself in turning in one direction or the other, causes parts longitudinally displaceable on it, by means of a friction ring which is capable of being turned out, to be coupled with other parts which are intended to carry along with them the first named parts in their rotations.

Figure 1:
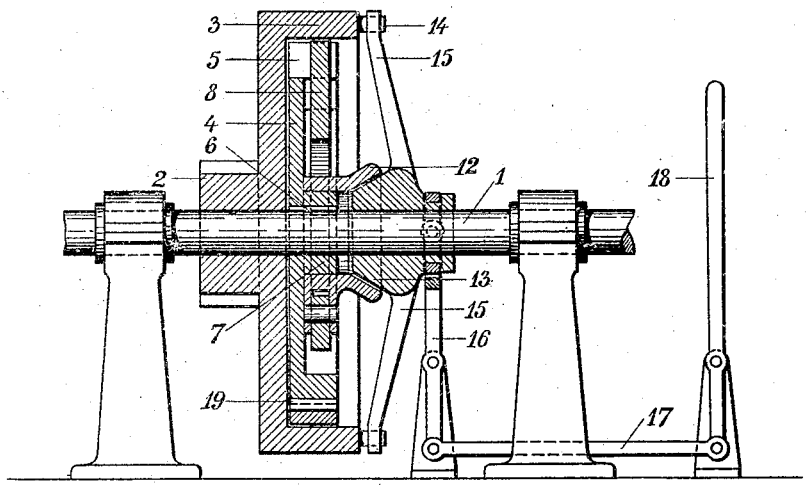
Figure 2:
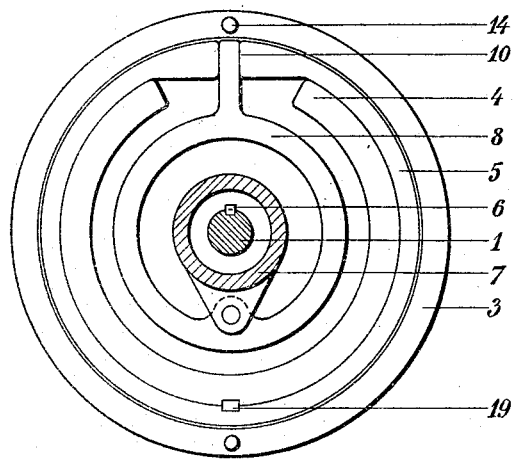

In the accompanying drawing: Figure 1 shows a friction coupling according to the present invention in vertical section. Fig. 2 is a vertical section through the same.

As shown in Figs. 1 and 2, 1 represents a driving shaft,—2—a toothed wheel mounted loosely on the said shaft, and the material in the said toothed wheel, which may, if desired, be exchanged for a friction disk, is formed into, or connected with a sleevelike part —3—. Inside the said sleeve —3— there runs independently of the said sleeve the ring —4—, which, being firmly united with the driving shaft —1— by means of the key —6—, is consequently always carried along in the rotation of the driving shaft. Around the ring —4—, and at one place united with it, is mounted a ring —5—, which consequently is carried along in the rotation of the ring —4—, but is free to expand, owing to its being severed at one place, where it leaves an opening —10— of a suitable nature, see Fig. 2. It also appears from Fig. 2 that the ring —5— by means of a key —19—, or a similar device as above mentioned, is fixed to the ring —4—, in order to be carried along in the rotation of the ring —4—, that is to say, with the same velocity as the driving shaft —1—.

In the opening —10— is fitted an arm —8—, which with its other end is rotatably united with, or joins onto, another ring —7—, running freely on the shaft, which at its end opposite to the ring —4— is formed into a friction cone —12—. On the driving shaft there is inverted alongside of the said friction cone —12—, but running freely, another friction cone —13—, which is carried along in the rotation of the sleeve —3—, for instance by means of pins —14— projecting from the sleeve —3—, which pins grip arms —15— projecting from the friction cone, and this outer friction cone —13— is so arranged that it can be moved from or toward the friction cone —12—, but nevertheless during its whole axial movement, as far as its turning is concerned, is firmly united to the sleeve —3—, and thereby also with the driving wheel —2—.

From the arrangement in accordance with Figs. 1 and 2, the friction device in accordance with Fig. 3, corresponding to Fig. 1, differs merely in the fact that the ring —7—, the friction cones —12— and —13—, the pins —14—, and the arms —15— are replaced by a friction disk —9— conic at its periphery, which friction disk —9— on being placed up against the sleeve —3—, which in this case is formed in a corresponding manner, is carried by friction along with its movement.

The function of the above device is rendered clear by the following, wherein it is assumed that the friction cones —12— and —13— are arranged, as mentioned, in accordance with Figs. 1 and 2, and that the cone —13— is provided with a suitable device for the transmission of the movement, for instance the levers —16—, —17—, and —18—, which are movably connected with one another, so that the arm —18—, provided with a handle, can cause the cone —13— to be move displaced.

If the driving shaft —1— rotates without the friction cones —12— and —13— coming into contact with one another, the rings —4—, —5—, —7—, as well as the arm —8— placed between them, will be carried along in the rotation of the shaft, and if the ring —5— is executed in such a manner that it does not rest up against the inner surface of the sleeve —3—, the said sleeve —3—, with the accompanying driving wheel —2— and the frictions cone —13—, will remain stationary in their respective positions, thus without being carried along in the rotation of the driving shaft —1—. If, on the other hand, the friction cone —13— is pressed against the friction cone —12— and the driving shaft —1— turns in one direction or the other, the friction cone —12— has the tendency by means of the friction between the cones —12— and —13— when the cone —13— is stationary, to be impeded in its turning movement. During the continued rotation of the driving shaft —1—, and while it continues to hold the ring —7— secured the latter hinders one end of the arm —8— from being carried along in the turning movement which the driving shaft —1— imparts to the rings —4— and —5—, with the result that the arm —8— assumes an oblique position in the opening —10— of the ring —5—, that is to say, the arm —8— presses out the ring —5—, so that it expands. By the expansion of the ring —5— friction is obtained between the ring —5— and the sleeve —3—, and when this friction is great enough to cause the sleeve —3— and the driving wheel —2— to be carried along in the turning movement of the rings —4— and —5—, it is evident that the driving wheel —2— and the sleeve —3—, together with the two friction cones —12— and —13— are also carried along in the movement.

As appears from the above and from the drawing, only a comparatively slight evolution of force between the cones —12— and —13— is required in order to hold the ring —7— sufficiently secure to turn the arm —8— in a position oblique to the opening —10— of the ring —5—, besides which the arm —8— by means of suitable length and suitable leverage in relation to the surfaces of the severed ring —5—, will develop the required expansive force on this ring.

With the present arrangement is attained the great advantage, as compared with friction couplings hitherto constructed, that the force which is consumed in bringing about the friction, is evolved by the driving shaft itself, and the only force which requires to be developed in another manner, that is, hand power, or the like, will press the friction cone —13— hard enough against the friction cone —12—, that on the turning of the driving shaft —1—, its whole force is developed in order to distend the ring —5—, by the device that the ring —8— is turned to the side. As soon as sufficient friction arises between the ring —5— and the sleeve —3—, all the parts of the whole device are carried along in the rotation of the machine shaft. The force exerted by the driving shaft itself distends the ring —5— in the required degree, and this need of sufficient friction between the ring —5— and the sleeve —3— is entirely and directly dependent on the resistance from the driving wheel —2—.

What I do claim as my invention and desire to secure by Letters Patent is:

1. A friction coupling of the character described, comprising in combination, a driving shaft, a toothed wheel loosely turning on said shaft, a sleeve on said wheel, and a ring keyed to said shaft, a second ring surrounding the first one and participating in its rotation, said second ring being slit to allow of an expansion, an arm fitting with one of its ends into said slit, a third ring loosely turning on said shaft to which the other end of said arm is pivotally secured, all of said rings within said sleeve and friction clutch members for expanding said slit ring to effect a coupling of the driving shaft with the parts to be driven, substantially as described.

2. A friction coupling of the character described, comprising in combination, a driving shaft, a toothed wheel loosely turning on said shaft, a sleeve on said wheel, and pins on said sleeve, a ring keyed to said shaft, a second ring surrounding the first one and participating in its rotation, said second ring being slit to allow of an expansion, an arm fitting with one of its ends into said slit, a third ring loosely turning on said shaft to which the other end of said arm is pivotally secured, all of said rings within said sleeve, and a friction cone on said third ring and a friction cone on said driving shaft, and arms on said cones adapted to engage with the pins on said sleeve for expanding said slit ring to effect a coupling of the driving shaft with the parts to be driven, substantially as described.

In testimony whereof I have signed my name to this specification in the presence of two subscribing witnesses.

Signed at Gottenborg.

PAUL WILHELM SIEURIN.

Witnesses:
A. W. ENANDER,
S. E. SMALLMAN.